G. WARFIELD.
PLANTER.
APPLICATION FILED JULY 18, 1917.

1,254,555.

Patented Jan. 22, 1918.
2 SHEETS—SHEET 1.

WITNESS
L. Wilrop

INVENTOR
G. Warfield,
BY Victor J. Evans
ATTORNEY

G. WARFIELD.
PLANTER.
APPLICATION FILED JULY 18, 1917.

1,254,555.

Patented Jan. 22, 1918.
2 SHEETS—SHEET 2.

WITNESS
J. Wilcox

INVENTOR
G. Warfield,
BY Victor J. Evans
ATTORNEY

UNITED STATES PATENT OFFICE.

GORDON WARFIELD, OF HELENA, ARKANSAS.

PLANTER.

1,254,555.  Specification of Letters Patent.  Patented Jan. 22, 1918.

Application filed July 18, 1917. Serial No. 181,321.

*To all whom it may concern:*

Be it known that I, GORDON WARFIELD, a citizen of the United States, residing at Helena, in the county of Phillips and State of Arkansas, have invented new and useful Improvements in Planters, of which the following is a specification.

This invention relates to seed planters and it consists in the novel features hereinafter described and claimed.

An object of the invention is to provide a seed planter especially adapted to be used for depositing cotton seed although the planter may be used to advantage for planting corn or similar grain.

With the above object in view the planter comprises a wheel mounted frame having a cross beam secured to the upper portion thereof and provided at its ends with upwardly and outwardly disposed arms which in turn carry drums and suitable cranks for rotating the same. Guide arms are provided at the opposite sides of the frame and hopper frames are provided with links which are slidably mounted upon the said arms. Levers are positioned upon the primary frame and operatively connected with the hopper frame and may be used for moving the same in or out. Flexible elements are connected with the said hopper frames and are adapted to wind about the said drums. A hopper frame is located at the intermediate portion of the primary frame and is connected with the same by means of links and a lever is mounted upon the primary frame and is connected by means of a chain or flexible element with the intermediate hopper frame and may be used for raising or lowering the same.

In the accompanying drawing:—

Figure 1:
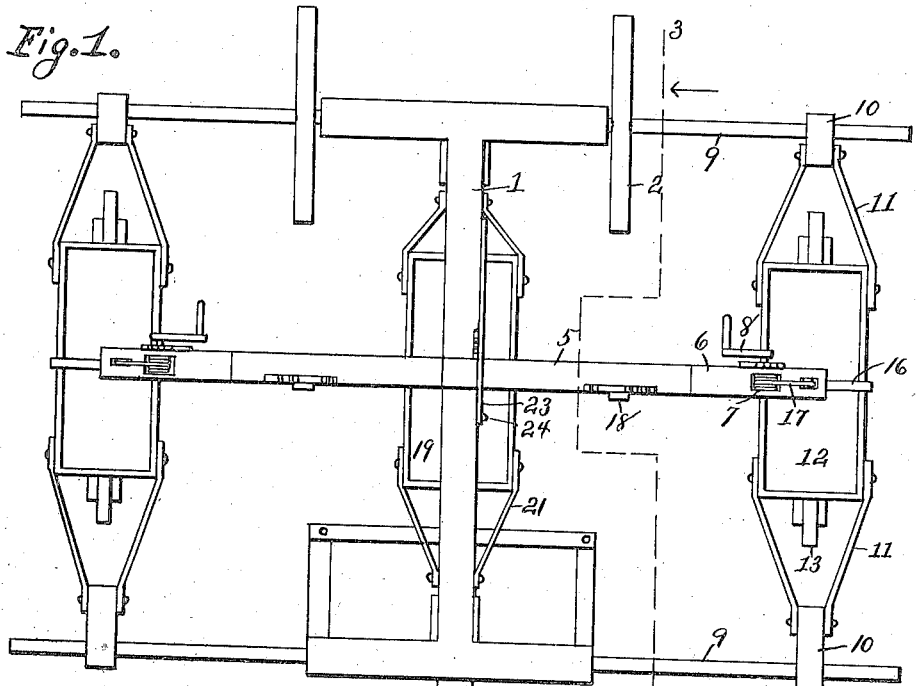
Figure 1 is a side elevation of the planter.
Figure 2:
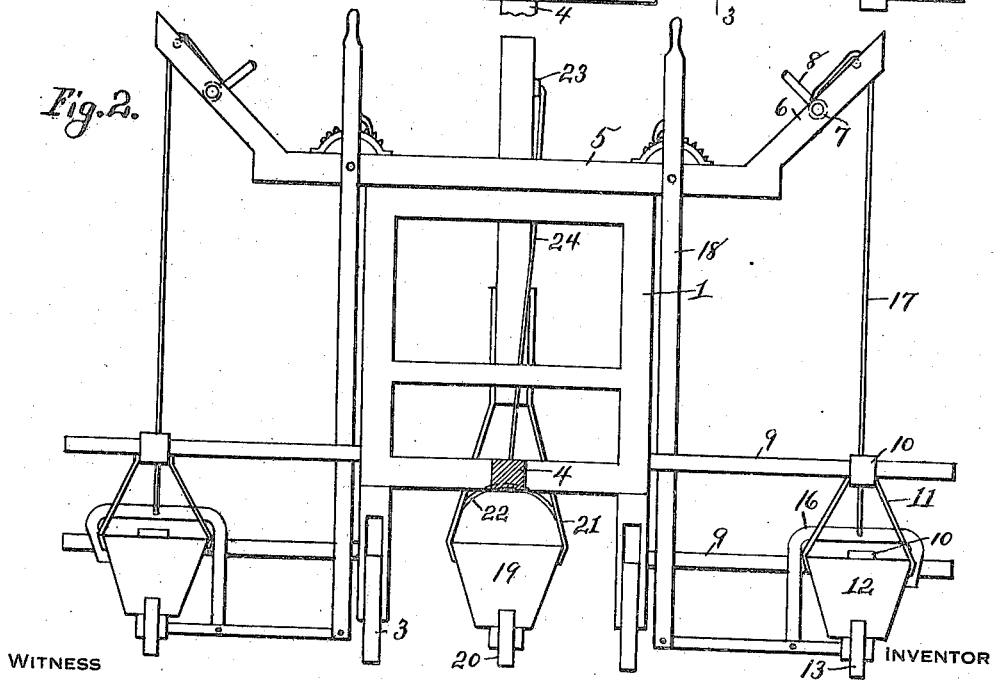
Fig. 2 is a top plan view of the same.
Figure 3:
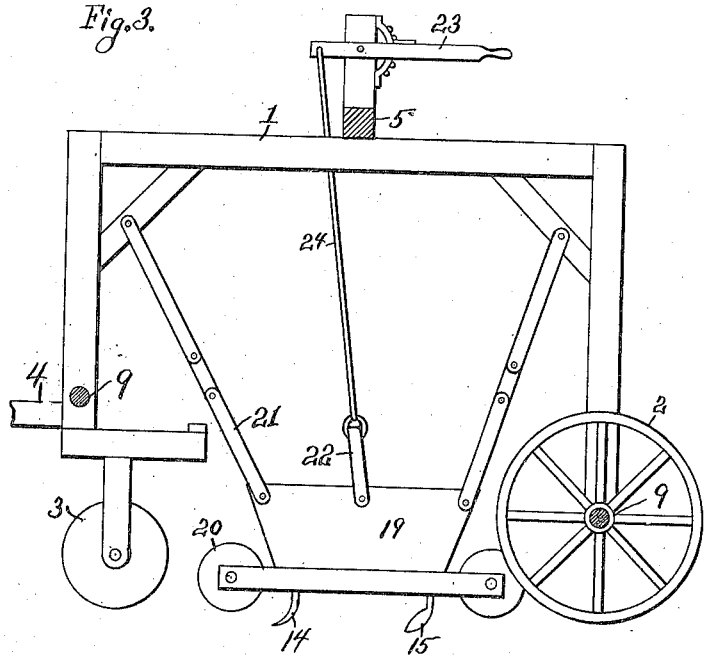
Fig. 3 is a sectional view of the same cut on the line 3—3 of Fig. 1.
Figure 4:
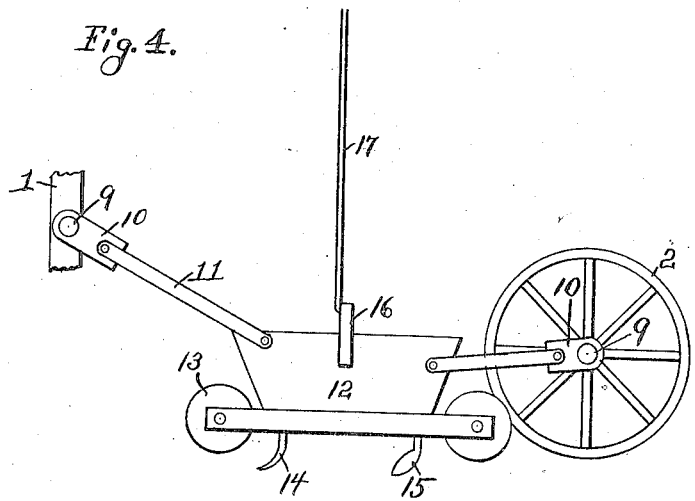
Fig. 4 is a fragmentary side elevation of the same.

The planter comprises a frame 1 which is preferably constructed from wood and which is supported at its rear portion upon wheels 2 and at its front portion upon wheels 3. A tongue 4 is attached to the forward portion of the frame 1 and draft animals may be hitched to the frame in a usual manner. A cross-beam 5 is mounted upon the frame 1 at a point between the forward and rear ends thereof and the said beam carries at its end portion upwardly and outwardly extending arms 6. Drums 7 are arranged for rotation upon the arms 6 and are provided at their shafts with crank handles 8. Guide arms 9 are attached to the sides of the frame 1 in the vicinity of the forward and rear ends thereof and the guide arms at the same side of the frame are parallel with relation to each other. Blocks 10 are slidably mounted upon the guide arms 9 and links 11 are pivotally connected at one end with the blocks and pivotally connected at their other ends with hoppers 12. The hoppers 12 are mounted upon wheels 13 and the said hoppers are provided with furrow openings 14 and furrow closers 15. If desired the hoppers 14 may be provided with dropping mechanisms but preferably the said hoppers are merely provided with openings in their bottoms through which the seed may gravitate. Bails 16 are connected with the hoppers 12 and chains 17 are attached to the said bails and are arranged to wind upon the drums 7 when the same are turned by using the handles 8. Levers 18 are fulcrumed upon the frame 1 and are operatively connected with the bails 16 and may be used for moving the hoppers 12 in inward or outward direction with relation to the sides of the frame 1. A hopper 19 is located at the intermediate portion of the frame 1 and is supported upon wheels 20. This hopper is further provided with furrow openings and furrow closers similar to the openings 14 and closers 15 hereinbefore described in conjunction with the hoppers 12. The hopper 19 is pivotally connected with the frame 1 by means of links 21 but the hopper is restrained against lateral movement with relation to the frame 1. The hopper 19 is provided with a bail 22 and a lever 23 is fulcrumed upon the frame 1. A chain 24 is connected at one end with the lever 23 and is connected at its other end with the bail 22. It is apparent that when the lever 23 is swung vertically the chain 24 is moved longitudinally and hence the hoppers 19 may be raised or lowered.

The operation of the planter is as follows:—

Seed is supplied to the hoppers 12 and 19 and the levers 18 are manipulated to place the hoppers 12 at desired distances from the hopper 19. As the machine moves over a field the furrow openings engage the soil and open furrows into which the seed is deposited and the furrow closers cast the soil back into the furrows and cover the seed. When the machine arrives at the end of a row and it is desired to turn the same the drums 7 are rotated whereby the hoppers 12 are elevated and the lever 18 is swung whereby the hopper 19 is raised. Consequently the machine may be readily turned around and furthermore the said hoppers may be elevated with relation to the ground when the machine is transported from point to point.

From the foregoing description taken in conjunction with the accompanying drawing it will be seen that a planter of simple and durable structure is provided and that the same may be adjusted readily to plant seed in rows at desired distances apart.

Having described the invention what is claimed is:—

1. A planter comprising a wheel mounted frame, a beam disposed transversely thereon, guide arms carried by the frame, hopper mechanisms slidably mounted upon the guide arms, means mounted upon the beam for raising and lowering the hopper mechanisms, a hopper mechanism located at the intermediate portion of the frame and means for raising or lowering the last mentioned hopper mechanism.

2. A planter comprising a wheel mounted frame, a beam disposed transversely thereon and having upwardly and outwardly disposed arms, drums journaled upon the arms, guide arms carried at the opposite sides of the frame, hopper mechanisms slidably mounted upon the guide arms, means for sliding the hopper mechanisms, and flexible elements connected with the hopper mechanisms and trained around the drum.

3. A planter comprising a wheel mounted frame, a beam disposed transversely thereof, guide arms carried at the opposite sides of the frame, blocks slidably mounted upon the guide arms, links pivotally connected with the blocks, hoppers pivotally connected with the links, bails attached to the hoppers, means supported upon the beam and connected with the bails for raising and lowering the hoppers, means for sliding the blocks and hoppers, an intermediate hopper mechanism connected with the frame and means for raising or lowering the last mentioned hopper mechanism.

4. In a planter a frame, guide arms mounted thereon, blocks slidably mounted upon the guide arms, means for sliding the blocks, links pivotally connected with the blocks, a hopper connected with the links and means for raising and lowering the hopper.

In testimony whereof I affix my signature.

GORDON WARFIELD.

Copies of this patent may be obtained for five cents each, by addressing the "Commissioner of Patents, Washington, D. C."